No. 709,550. Patented Sept. 23, 1902.
L. M. MEYRICK-JONES.
MOTOR ATTACHMENT FOR CYCLES.
(Application filed Jan. 21, 1902.)
(No Model.) 3 Sheets—Sheet 1.
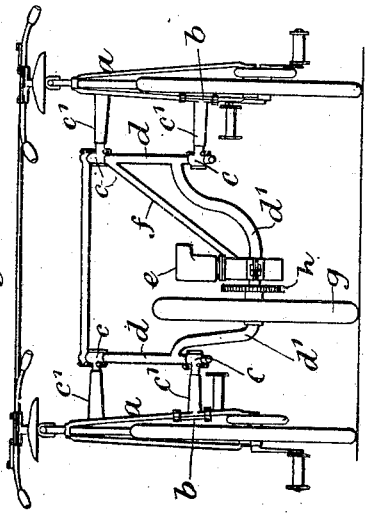
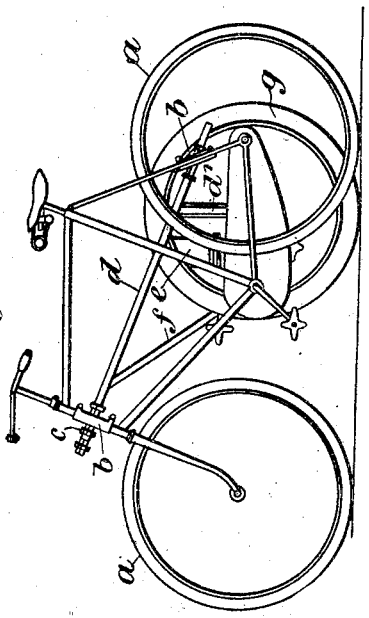
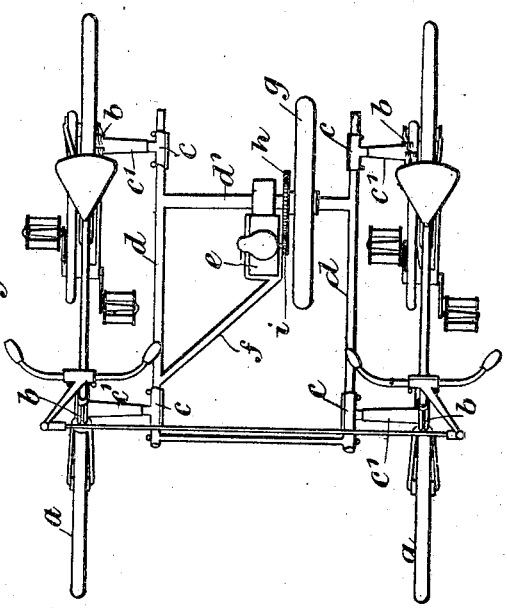
Witnesses.
E. H. Parkins.
A. M. Parkins.
Inventor.
L. M. Meyrick-Jones,
By his Attorneys,
Baldwin Davidson & Wight No. 709,550. Patented Sept. 23, 1902.
L. M. MEYRICK-JONES.
MOTOR ATTACHMENT FOR CYCLES.
(Application filed Jan. 21, 1902.)
(No Model.) 3 Sheets—Sheet 2.
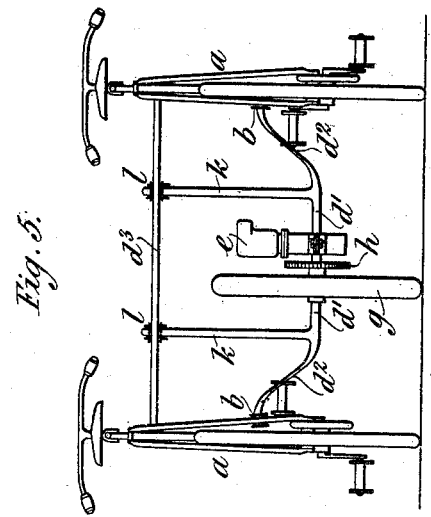
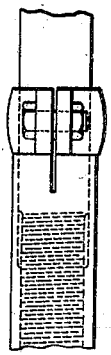
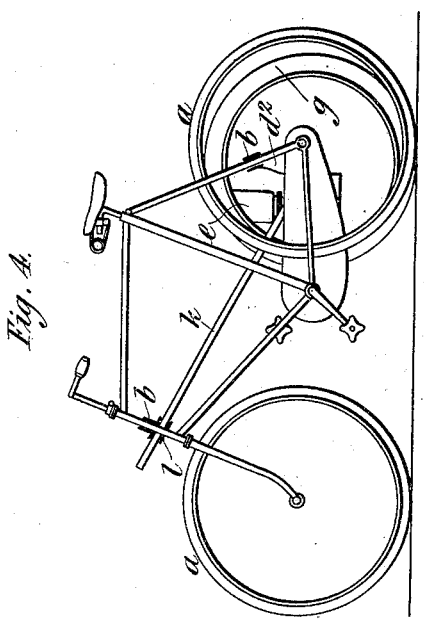
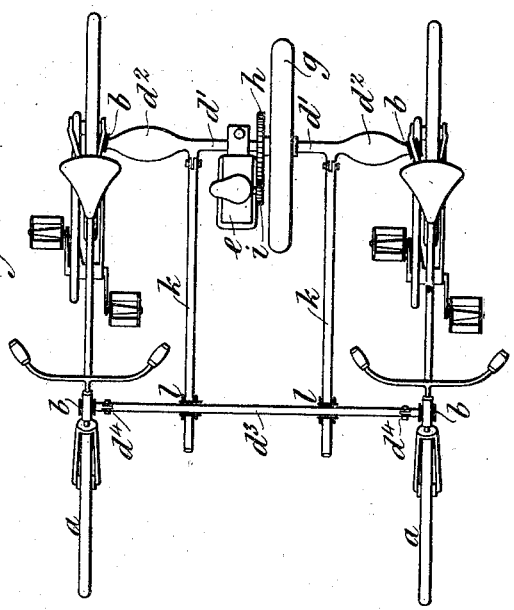
Witnesses
E. H. Parkins.
A. M. Parkins.
Inventor.
L. M. Meyrick-Jones,
By his Attorneys,
Baldwin Davidson Wight.

No. 709,550. Patented Sept. 23, 1902.
L. M. MEYRICK-JONES.
MOTOR ATTACHMENT FOR CYCLES.
(Application filed Jan. 21, 1902.)
(No Model.) 3 Sheets—Sheet 3.
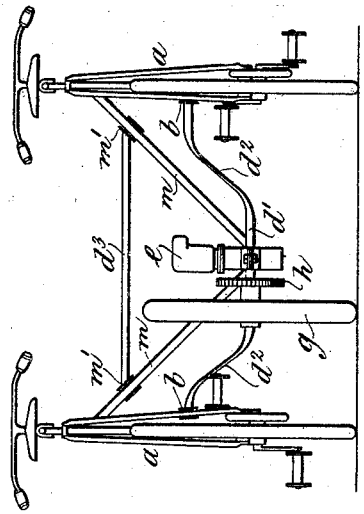
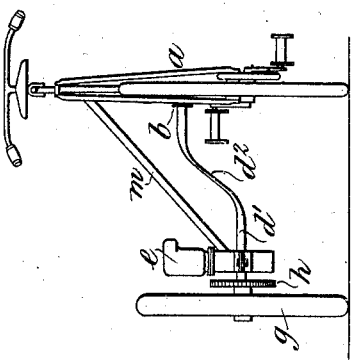
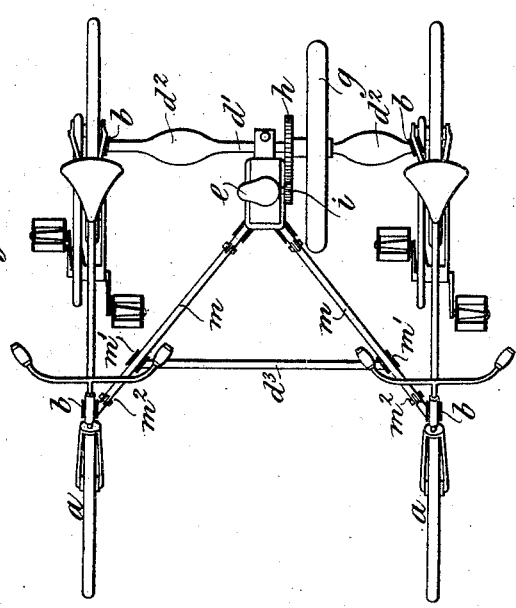
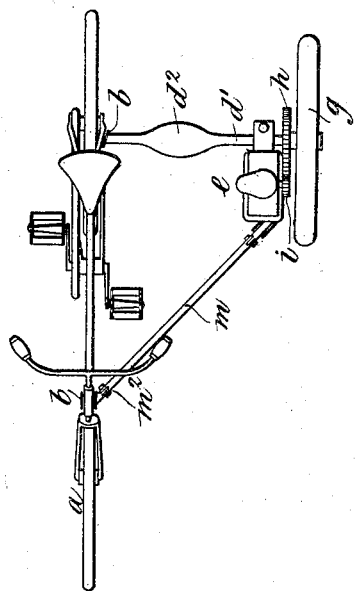
Witnesses
E. H. Parkins.
A. M. Parkins.
Inventor:
L. M. Meyrick-Jones,
By his Attorney,
Baldwin Davidson & Wight.

UNITED STATES PATENT OFFICE.

LEONARD MEYRICK MEYRICK-JONES, OF EAST DEREHAM, ENGLAND.

MOTOR ATTACHMENT FOR CYCLES.

SPECIFICATION forming part of Letters Patent No. 709,550, dated September 23, 1902.

Application filed January 21, 1902. Serial No. 90,653. (No model.)

*To all whom it may concern:*

Be it known that I, LEONARD MEYRICK MEYRICK-JONES, engineer, a subject of the King of Great Britain, residing at Bawdeswell, East Dereham, in the county of Norfolk, England, have invented a certain new and useful Improved Means for Enabling Motors to be Used with Bicycles, of which the following is a specification.

Various ways have before been suggested for linking together two bicycles side by side at a distance apart by a connecting-frame. This connecting-frame has also been arranged to carry a motor for driving the driving-wheels of the bicycles.

In place of giving motion from the motor to the driving-wheels of the bicycles I provide the connecting-frame, preferably at its rear end, with a driving road-wheel and give motion to this road-wheel from the motor, leaving the bicycle driving-wheels to be driven by ordinary pedal-gear whenever desired. To insure that the driving-wheel carried by the connecting-frame shall always bear upon the ground with sufficient pressure, I also in some cases provide springs, which tend to depress this wheel below the level of the bicycle driving-wheels. Similarly a frame provided with a driving road-wheel actuated by a motor may be coupled to one side of a bicycle at a distance from it and the driving-wheel kept pressed down by a spring.

My improvements are shown in the drawings annexed.

Figure 1 is a side view, Fig. 2 a back view, and Fig. 3 a plan, of two bicycles coupled by a connecting-frame provided with a road-wheel and motor for driving this wheel. Figs. 4, 5, and 6 show similar views of a modification, in which parts of the back bar of the connecting-frame form springs to keep the driven road-wheel pressed down onto the ground. Figs. 7 and 8 show a back view and plan of another modification, in which the construction of the connecting-frame is modified. Figs. 9 and 10 show a back view and plan of a similar frame carrying a road-wheel and motor for driving it coupled to one side of a cycle. Fig. 11 shows one way in which the stays and cross-bars of the frame may be made adjustable in length.

In Figs. 1, 2, and 3, $a\ a$ are two bicycles. $b\ b$ are clamps clamped to the heads and backstays of the bicycle-frames. $c\ c$ are other clamps coupled by swivel connections $c'$ to the clamps $b$, as described in another application for patent made by me, Serial No. 75,777. The clamps $c$ grasp two longitudinal rods forming part of a frame $d$, which thus serve to connect together the two bicycles side by side at a distance apart. $e$ is a motor, the frame of which is secured to the back bar $d'$ of the frame $d$ and by a cross stay-bar $f$ to the front end of one of the longitudinal side rods of this frame. $g$ is a road-wheel revolving around part of the back bar $d'$ of the frame $d$, which thus serves as its axle. $h$ is a toothed wheel fast with the wheel $g$, and $i$ is a pinion gearing therewith and fast upon the axis of the motor $e$.

In Figs. 4, 5, and 6 a portion of the back connecting-bar $d'$ near each end is made to form a spring $d^2$ and serves to press the driving-wheel $g$ downward against the ground, the springs giving way in a vertical direction, but remaining stiff horizontally. The clamps $c$ are also done away with, and the clamps $b$ attach the ends of the front bar $d^3$ and back bar $d'$ directly to the heads and backstays of the two bicycles. Stay-bars $k$ are also made to extend directly from the back bar to clamps $l$, secured to the front bar. The front bars $d^3$ may be connected by joints $d^4$ to the clamps $b$. They may also be made extensible in length, preferably in the manner illustrated in Fig. 11. In Figs. 7 and 8 a similar construction is shown, except that in place of the stay-bars $k$ diagonal tie-bars $m$ are made to extend from the motor-frame to the clamps $b$, embracing the bicycle steering-heads. The front bar $d^3$ is also shown to be secured by clamps $m'$ to the front portions of the diagonal tie-bars $m$. The tie-bars $m$ may be made adjustable in length and be jointed by joints $m^2$ to the clamps $b$. In Figs. 9 and 10 a similar construction is shown for connecting a road-wheel and a motor by which it is driven to the frame of a single bicycle. The back bar $d'$, which at its outer end serves as an axle for the road-wheel $g$, is at its other end secured to one of the backstays of the bicycle-frame, and a diagonal tie-bar $m$ extends from the motor-frame to the clamp $b$, which embraces the bicycle steering-head.

The back bar or axle $d'$ may be made adjustable in length in the manner illustrated in Fig. 11, so that the clamp $b$ at the extremity of the stay or tie bar $m$ may be brought into position to clamp the steering-head at whatever distance the steering-head may be from the point at which the axle $d'$ is secured to the frame.

Preferably in all cases the road-wheel $g$ is provided with an inflated pneumatic tire.

In all the figures similar parts are marked with the same letters of reference.

What I claim is—

1. The combination of two bicycles, a framework connected to the frame of both bicycles by clamps and coupling them side by side at a distance apart, a road-wheel carried by the framework and a motor driving this wheel also carried by the framework.

2. The combination of two bicycles, a framework connected to the frame of both bicycles by clamps and coupling them side by side at a distance apart a road-wheel carried by the framework, springs acting to press downward this road-wheel and a motor driving the road-wheel.

3. The combination of two bicycles side by side at a distance apart, a tie-rod, clamps at its ends secured to the two bicycle-frames, a road-wheel mounted upon and capable of being revolved around the rod, a motor attached to the rod and driving the wheel, stays extending from the rod to the ends of the bicycle-frames and a tie-bar holding apart the ends of these frames.

4. The combination of two bicycles side by side at a distance apart, a tie-rod, clamps at its ends secured to two bicycle-frames, a road-wheel mounted upon and capable of being revolved around the rod, a motor attached to the rod and driving the wheel, portions of the rods formed as springs to force the road-wheel against the ground, a tie-bar holding apart the ends of the bicycle-frames and cross-stays for keeping the rod and tie-bar at right angles to the bicycle-frames.

5. In a motor attachment for bicycles the combination of a rod, a road-wheel mounted upon and capable of being revolved around the rod, a motor attached to the rod and driving the wheel, a clamp at one end of the rod by which it can be attached to the bicycle-frame so as to stand out sidewise at right angles to it, and a stay fast at one end with the rod and at the other adapted to be secured to the bicycle-frame.

6. In a motor attachment for bicycles the combination of a rod, a road-wheel mounted upon and capable of being revolved around the rod, a motor attached to the rod and driving the wheel, a clamp at one end of the rod by which it can be attached to the bicycle-frame so as to stand out sidewise at right angles to it, a portion of the rod formed as a spring to force the road-wheel against the ground, and a stay fast at one end with the rod and at the other adapted to be secured to the bicycle-frame.

LEONARD MEYRICK MEYRICK-JONES.

Witnesses:
H. R. EVERITT,
F. T. HALL.